Dec. 28, 1965  J. A. BERNARD ETAL  3,226,301
HETEROGENEOUS NUCLEAR REACTOR LIQUID MODERATED AND COOLED
Filed Oct. 2, 1963  7 Sheets-Sheet 1

INVENTORS
Jean A. BERNARD
Joachim BUNGE
Jacques DUFRESNE
Sergio FINZI
Giusepe VOLTA
BY

ATTORNEYS

INVENTORS
Jean A. BERNARD
Joachim BUNGE
Jacques DUFRESNE
Sergio FINZI
Giusepe VOLTA

BY

ATTORNEYS

INVENTORS
Jean A. BERNARD
Joachim BUNGE
Jacques DUFRESNE
Sergio FINZI
Giusepe VOLTA

ATTORNEYS

Dec. 28, 1965    J. A. BERNARD ETAL    3,226,301
HETEROGENEOUS NUCLEAR REACTOR LIQUID MODERATED AND COOLED
Filed Oct. 2, 1963    7 Sheets-Sheet 4

INVENTORS
Jean A. BERNARD
Joachim BUNGE
Jacques DUFRESNE
Sergio FINZI
Giusepe VOLTA
BY

ATTORNEYS

United States Patent Office 3,226,301
Patented Dec. 28, 1965

3,226,301
HETEROGENEOUS NUCLEAR REACTOR LIQUID
MODERATED AND COOLED
Jean A. Bernard, Olginasio (Varese), Italy, Joachim Bunge, Brussels, Linkebeek, Belgium, and Jacques Dufresne, Varese, Sergio Finzi, Masnago (Varese), and Giuseppe Volta, Ispra (Varese), Italy, assignors to European Atomic Energy Community-Euratom, Brussels, Belgium
Filed Oct. 2, 1963, Ser. No. 313,217
5 Claims. (Cl. 176—52)

The present invention relates to a heterogeneous nuclear reactor which is liquid moderated and cooled and more particularly, although not exclusively, to a reactor moderated by a liquid such as heavy water and cooled by another liquid such as a hydrocarbon or a polyphenyl etc.

Heavy water is known to be the best moderator known at present and its use is only limited by its relatively high cost. Liquids offer serious advantages as heat carrying fluids mainly because of their heat absorbing qualities and, amongst them, certain organic compounds are even more interesting because of their high boiling points which makes it possible to take away great quantities of heat without causing any appreciable rise in pressure in the circuits, that is, they are advantageous from the standpoint of thermodynamic efficiency, Finally, these organic liquids cost little, have a good irradiation resistance and do not react with ordinary steel or aluminum.

The heat carrying fluid which comes in contact with the nuclear fuel elements is at a higher pressure and temperature than those of the moderating fluid; it is therefore necessary to separate the two fluids. A pressure barrier has already been obtained by means of sufficiently resistant metallic tubes called "power tubes." The temperature barrier is achieved by means of an isolating layer concentric to the power tube and mounted between the latter and another coaxial tube called "calender tube" which may either be outside or inside the power tube. In the first case, the power tube is said to be hot while in the second case it is said to be cold.

An essential purpose of the invention is to reduce pressure fatigue to which the power tubes are subjected by distributing the pressure between the said tubes, the calender tubes and an output collector for the heat carrying fluid, which is also under pressure.

An object of the invention is to provide, in a liquid moderated and cooled heterogeneous nuclear reactor, a combination comprising: a tank; a heat insulating shield in said tank dividing the said tank into an upper heavy water compartment and a lower collector compartment; a hollow completely closed heat insulated collector mounted in said collector compartment in spaced relationship therewith, said collector adapted to be partially filled with a heat carrying fluid; a plurality of reactor channels, vertically mounted in said tank; each channel having an inner power tube and an outer calender tube coaxial with and spaced from the power tube; both said tubes extending through said heat insulating shield and the wall of said collector and having their ends immersed in said liquid; means to deliver fluid under pressure in the space between said tank and said collector and maintain the pressure in said space between that of the liquid at the outlet of said tubes and that of the liquid in the collector, and injection means on said tubes interconnecting the space between the tank and the collector and the space above the liquid in the collector.

In a nuclear reactor made according to the invention, each channel is provided at its lower end, between the injection point of the auxiliary fluid under pressure and the free level of the heat carrying fluid in the collector, with a tight sliding joint of the labyrinth type arranged between the power tube or its extension and the calender tube or its extension, thus making it possible for the power tube to expand axially without stresses.

According to the invention, the moderator liquid is introduced into the tank, between the upper part of the tank and an inner wall, around the channels, along which it enters inside jackets which cross the said inner wall and dip below the free level of the heat carrying liquid into the tank.

The collector may rest at the bottom of the tank or hang in the tank by means of short rods or the like; the lower bottom of the tank may be connected to the tight thermal screen by strong braces which extend through the collector inside heat proof tubes where there is a certain space insulated against heat and expansion.

Power tubes are made of sintered aluminum and the calender tubes of aluminum or zircaloy.

A specific embodiment of the invention will now be described, by way of example, having reference to the annexed drawings wherein.

Figure 1:
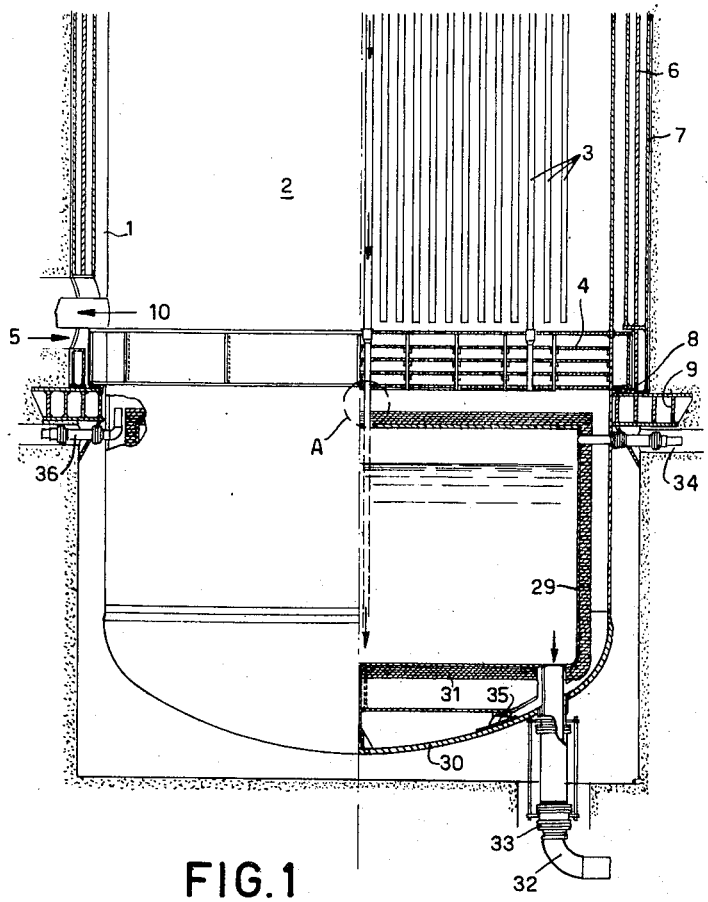
FIG. 1 is an elevation view, half in cross-section, of the lower part of a nuclear reactor made according to the invention.

FIG. 1 shows a tank 1 for the heavy water 2 of a moderated nuclear reactor; the tank being made of carbon steel plated with stainless steel, has a diameter in the order of 7 meters, a height in the order of 8 meters and a thickness in the order of 20 mm. Tank 1 contains several hundred channels 3 housing fuel elements and in which the heat carrying fluid circulates which, in this case, is an organic liquid such as terphenyl. The heavy water lies on a metallic bottom 4, acting as a bottom thermal shield, cooled by water flow 5 to maintain its temperature below 80° C.

As is known, tank 1 is surrounded by a thermal shield 6 of steel and a biological shield 7 of concrete. The tank sits on a metallic structure 9 through suitable means 8. Heavy water exits from the tank through pipe 10.

Figure 2:
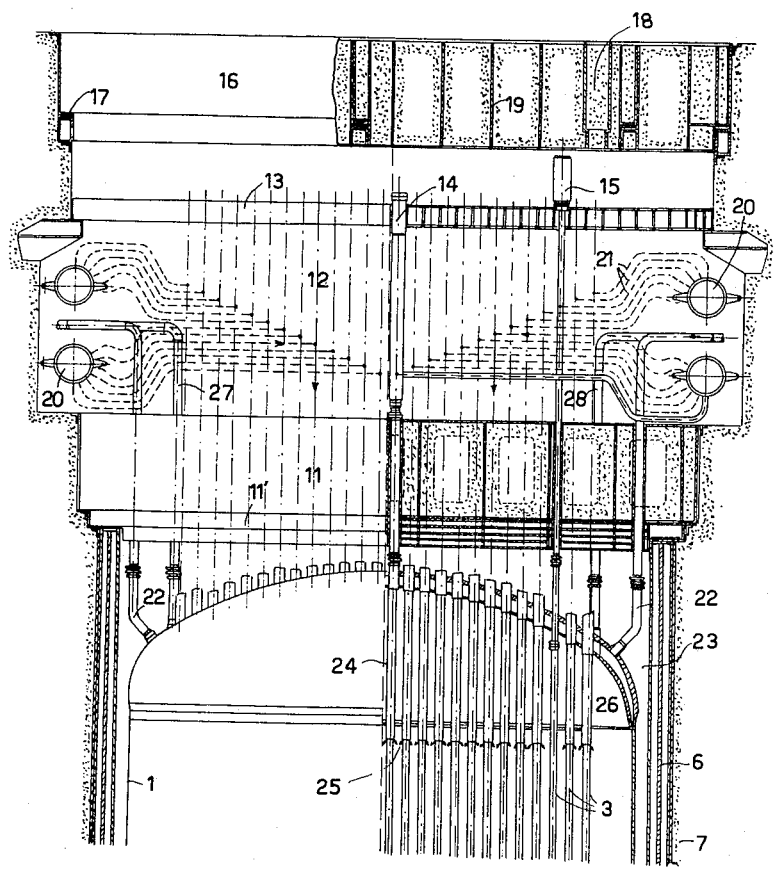
FIG. 2 is a view in elevation, half in cross-section, of the upper part of the same reactor.

FIG. 2 illustrates the upper part of tank 1 and channels 3. The tank is topped by a thermal shield 11' and a first biological shield 11 which also acts as supporting structure for the channels. A centering grate 13 for the channels is provided above this latter shield, in a tight compartment 12. Heads 14 of the channels are inserted in grate 13, as well as motors 15 of the control rods. A second biological shield 16 is mounted above compartment 12, shield 16 being rotatable about its axis through suitable means 17 so as to have each channel register with a removable unloading plug 18; the latter plug being furthermore mounted in a known manner in a large rotatable plug 19.

Eight headers for the heat carrying organic fluid are mounted within compartment 12; the quarter circle headers such as 20 being arranged so as to form two stacked rings and are adapted to feed channels 3 through individual piping layouts such as 21.

The input of the moderator heavy water is carried out through tubes 22 which open up in double top 23 of tank 1. From this double top, the heavy water penetrates into jackets 24 which surround the channels and enters tank 1 below the free level 25, the flow along the power tube being intended to cool it. The space 26 above the heavy water is filled with an inner gas such as helium, which is conveyed by tubes 27 and 28.

Referring again to FIG. 1, it is seen that the channels 3 (see the central channel which is the only one shown completely) extend through thermal shield 4 and enter into the lower collector 29, partially filled with organic liquid within which the channels appreciably penetrate; the liquid being at a temperature of the order of 400° C. Collector 29 is in the bottom part 30 of tank 1; this bottom part having a thickness of 65 mm. To prevent its temperature to rise above 80° C., the collector is insulated as at 31.

The organic liquid is expelled through pipe 32 provided with an expansion bellows 33. The gases which are expelled above the organic liquid are exhausted through a piping 34 also provided with expansion bellows. Collector 29 is supported by any convenient means 35 on the bottom 30 of tank 1.

According to the invention, collector 29 is subjected to an external pressure of the order of $7.10^5$ pascals (7 kg./cm.²) through a gas such as nitrogen, injected at 36 in the space comprised between collector 29, the lower thermal shield 4 and bottom 30 of tank 1.

Figure 3:
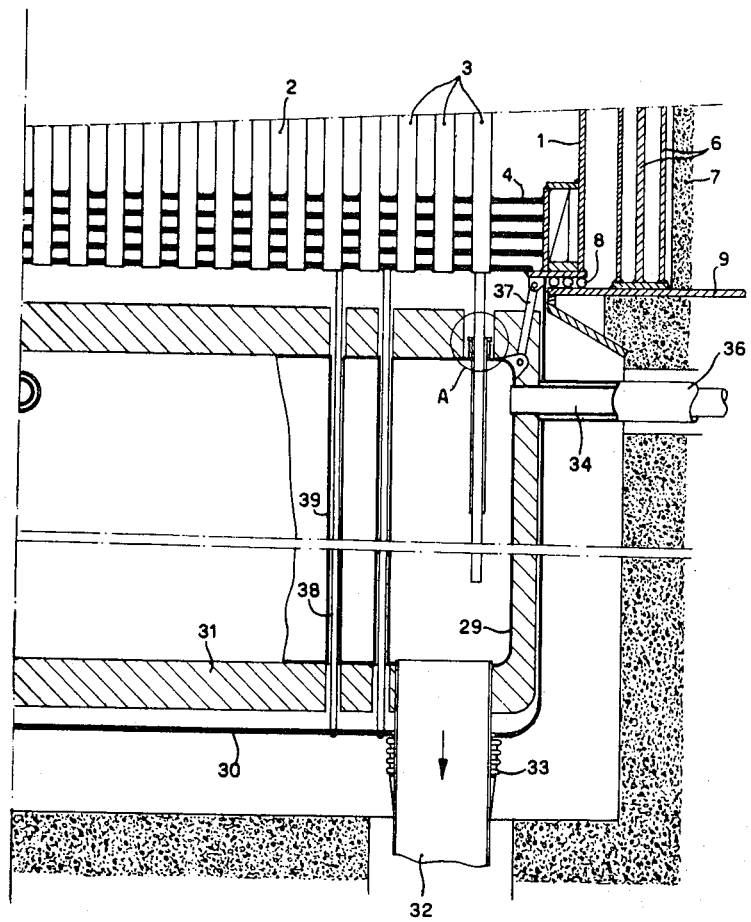
FIG. 3 is a cross-sectional half view, on an enlarged scale, of another embodiment of the lower part of a reactor according to the invention.

FIG. 3 illustrates a different embodiment of the manner in which to mount collector 29 in the bottom 30. Are illustrated: tank 1 containing the heavy water 2 and channels 3, the lower thermal shield 4, supports 8 and structure 9, organic liquid outlet 32, 33 and gas outlet 34. It will be noted that the injection of gas under pressure around collector 29 is carried out by means of a sheath 36 concentric with gas outlet 34.

Collector 29 is supported by means of short rods 37 secured to supports 8. On the other hand, the bottom 30 of the tank is strayed by means of struts 38 secured at one end to shield 4 and at the other end to the lower part of bottom 30. Struts 38 extend across collector 29 through tubes 39 welded to the top and bottom of the collector. Tubes 39 are so sized that they will allow a relative radial expansion between shield 4 and collector 29; heating of the tie rods or struts 38 being prevented by an insulating layer within tubes 39 as well as by the natural circulation of the nitrogen. The struts 38 are distributed according to a pitch which is double that of the fuel channel network.

Figure 4:
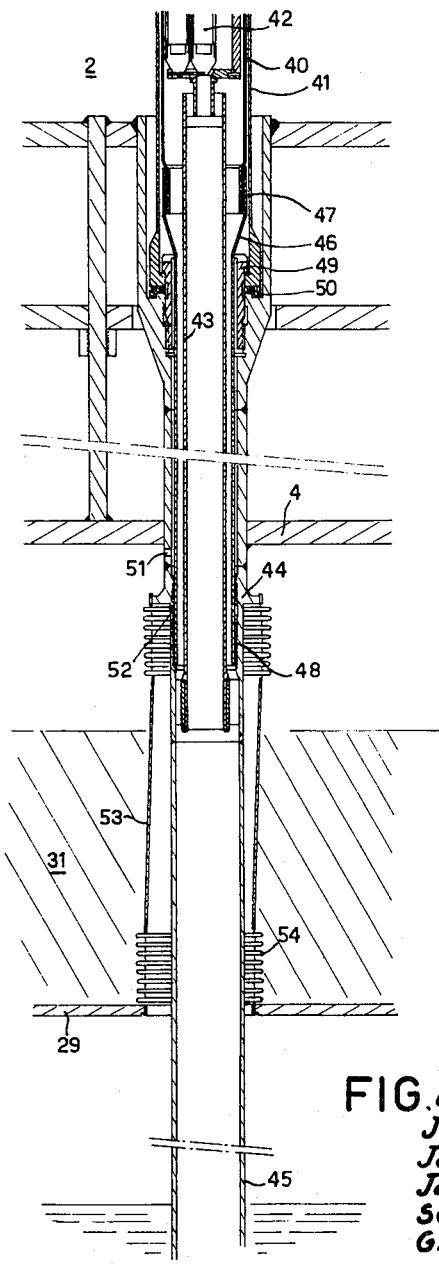
FIGS. 4, 5 and 6 are cross-sectional detail views of the lower joint between the fuel channels and the collector of the heat-carrying fluid, that is, enlarged views of the areas identified by the letter A on FIGS. 1 and 3.
Figure 5:
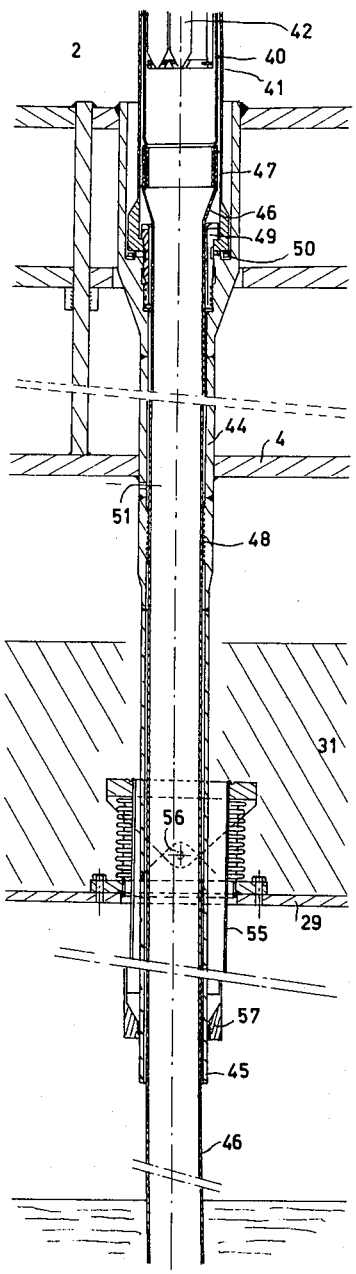
Figure 6:
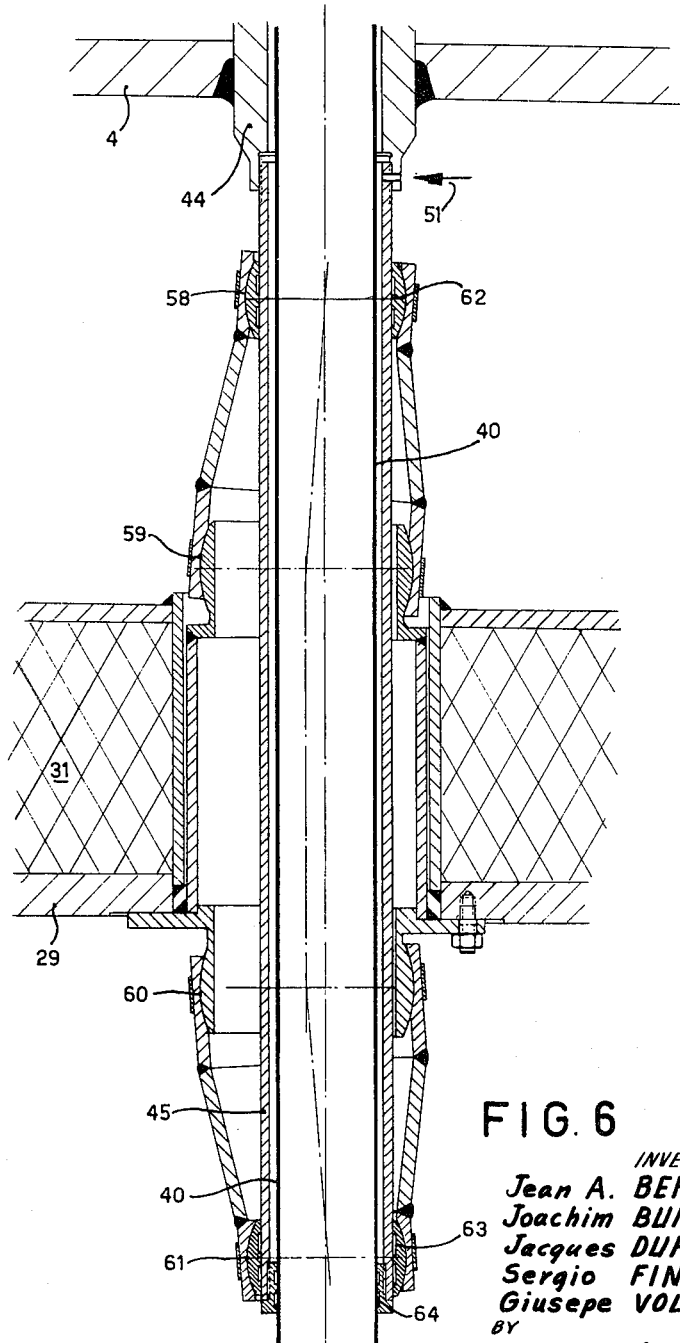

Referring now to FIGS. 4, 5 and 6, various embodiments of lower connections for the channels (referred to by the letter A in FIGS. 1 and 3) will now be described and the constitution of the said channels will be specified.

FIG. 4 illustrates a portion of thermal screen 4, the upper part of collector 29 and its insulation 31. Each channel 3 is made up, as aforesaid, of a power tube 40, a calender tube 41 and an intermediate insulating layer. Power tubes are made of 2 mm. sintered aluminum and the calender tube of 1.5 mm. aluminum; the intermediate layer having a thickness of 3 mm. is formed by the gas which acts to pressurize the collector of organic liquid, that is, nitrogen under a pressure of $7.10^5$ pascals.

Each channel contains nuclear fuel elements such as 42 supported by a tubular member 43 secured in a sheath 44 which, in turn, is welded or otherwise secured to shield 4. Sheath 44 extends downwardly into a tube 45, which is immersed in the organic liquid of the collector 29 and ends with a converging part (not shown) which causes an increase in the pressure of the heat carrying liquid at the level of the joint. Power tube 40 extends downwardly into a steel tube 46 which is swaged as at 47 and which slides in a labyrinth joint 48 of sheath 44. The foot of the calender tube 41 is tightened by a threaded ring 49 on a joint 50 housed within a shoulder of sheath 44. Finally, an inlet 51 of clean gas under pressure is provided in the labyrinth joint 48. The lower end of the labyrinth joint opens, through an orifice 52, in a sleeve 53 provided with bellows 54 surrounding tube 45 through the wall of collector 29 and insulation 31.

These joints make it possible for the power tube to expand freely and provide a gas inlet which does not contain organic vapours in the space adapted for the thermal insulation (thus preventing condensation which would cause important heat losses and dirtying of the insulating space). The velocity of the clean gas in the labyrinth, of the order of 50 cm./s., is greater than the velocity of diffusion of the organic vapours; therefore the latter cannot rise in the labyrinth. Furthermore, the different thermal expansions of the collector (at 400° C.) and of the thermal shield (at 80° C.) may occur without danger due to the flexibility of the bellows sleeve 53.

FIG. 5 illustrates another embodiment of this lower connection, in the case where the fuel elements 42 rather than resting on a bracket are hung from the top. Are again shown, the power tube 40 and calender tube 41 immersed in heavy water 2, the thermal shield 4 and the collector 29. The calender tube is pressed in a ring 49 on a joint 50 in a shoulder of sheath 44; the latter being continued downwardly by a tube 45 and having a labyrinth 48 within which tube 46 slides, the latter being swedged as at 47 on the power tube.

In this embodiment, tube 46 which is a continuation of the power tube dips into the organic liquid of collector 29, whereas tube 45 which is a continuation of the calender tube stops short thereof. Again, the clean gas comes in through an orifice 51 above labyrinth 48 but it goes out between tubes 45 and 46, in the collector 29.

The flexible joint between shield 4 and collector 29 is obtained by a sleeve 55 mounted on an articulation 56 integral with collector 29 and having, at the lower end thereof, a labyrinth joint 57 which slides in tube 45.

FIG. 6 illustrates a third embodiment wherein the flexible connection is obtained by means of spherical or bell joints or articulations 58, 59, 60 and 61 wherein the machining accuracy may be relatively rough as it is permissible to have a leak of the same order as that produced in labyrinths 62, 63 and 64. Inlet of the clean gas is through orifice 51 which discharges between the power tube 40 itself (which dips into the collector) and tube 45.

According to the invention, the space formed between the collector and the tank under pressure is filled with clean gas (nitrogen). The pressure of this gas is slightly greater than the pressure within the collector. The collector enclosure is in communication on the one hand with the heat insulating annular spaces of the channels and, on the other hand, with the gas above the level of the organic liquid in the collector. The pressure of the stagnant gas in the annular insulating spaces of the channels is therefore the same as that which exists in the tank under pressure. This pressure being slightly greater than that of the collector, there occurs a slight flow of nitrogen towards the collector through the labyrinth. The velocity of this gas has been determined in such a way as to avoid any rise of organic vapour and of gas above the level of the organic liquid in the collector, in the tank under pressure, therefore in the annular thermal insulating space.

Figure 7:
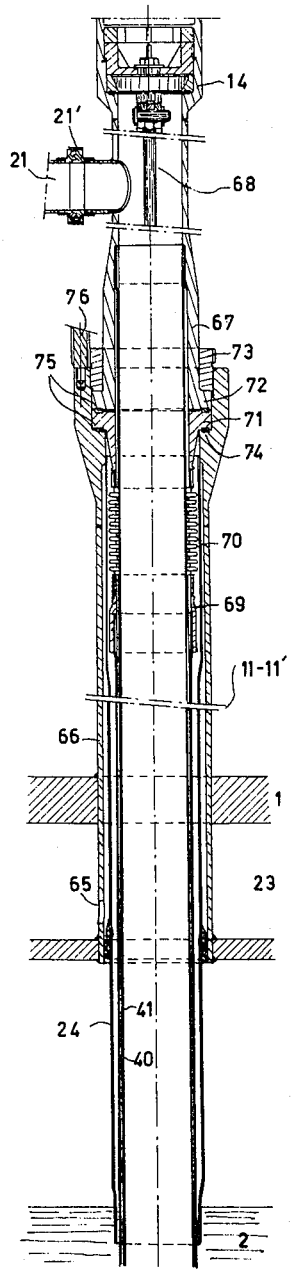
FIG. 7 is a cross-sectional detail view of the upper joint of the channels.

An upper connection will now be described in reference to FIG. 7. Again can be seen the power tube 40 and the calender tube 41, dipping in tank 1 containing heavy water 2. As said previously, the heavy water is introduced in the top 23 of the tank and, through an orifice 65, penetrates into a tube 66 which is an extension of the tank and within which tube the heavy water rises to the top opening of a metallic jacket 24 into which it enters and falls below the free level of the heavy water 2.

At the top, power tube 40 is received in a tubular steel member 67 to which is welded piping 21 for the inlet of the organic liquid, the joint 21' of which is removable from a distance. Above member 67 is welded the head of channel 14 containing the hooking device 68 for the fuel elements (not shown).

Calender tube 41 is mounted in a ring 69 connected to a sleeve 71 through a bellows 70. Sleeve 71 and flange 72 of member 67 are pressed against a shoulder 74 of the extension tube 66 by a ring 73. Fluid tightness of the joints is obtained by means of two couplings 75 and tightening is obtained by means of a pinion 76 meshing with ring 73.

A nuclear reactor provided with the invention offers the following advantages:

The stresses due to the pressure are distributed about evenly between the calender tube and the power tube: the power tube carries only the load loss in the channel, whatever be the pressure in the collector.

The variation of pressure in the power tube is reversed the variation in the temperature. The point most affected is the coldest point (top, suspension). The hottest point is not subjected to any stresses.

The power tube may axially and radially expand without stress; it is not subjected to the axial loads caused by the static pressure of the flow.

The calender tube only carries the external pressure of the collector, the thickness necessary to hold the inner pressure being less than the minimum obtainable thickness, an important safety coefficient is obtained.

The invention is interesting from a neutronic standpoint, considering the relatively small quantity of absorbing material making up the channel.

The weights and the loads which act on the fuel elements are never taken by the power tubes; they are taken either by the first upper biological shield, in the case of suspended fuel elements, or by the lower heat shield, in the case of standing fuel elements. The gaseous insulating system used has a good efficiency.

Due to the construction, the insulating gas pressure is balanced by the outlet pressure of the organic liquid, thus avoiding any regulating system.

With the lower connector, the installation of several hundred collectors is avoided; it also acts as an expansion container and a pressurizer.

The hot collector does not take any pressure as it is located inside a cold tank which is capable of resisting the pressure of the auxiliary fluid.

It is possible to mount a relatively simple leak detection system between the power and calender tubes of each channel.

We claim:

1. In a liquid moderated and cooled heterogeneous nuclear reactor, the combination comprising:
   (a) a tank;
   (b) a heat insulating shield in said tank dividing the said tank into an upper heavy water compartment and a lower collector compartment for a heat carrying fluid;
   (c) a hollow completely closed heat insulated collector mounted in said collector compartment in spaced relationship therewith; said collector being partially filled with a heat carrying fluid;
   (d) a plurality of reactor channels, vertically mounted in said tank; each channel having an inner power tube and an outer calender tube coaxial with and spaced from the power tube; both said tubes extending through said heat insulating shield and the wall of said collector and having their ends immersed in said heat-carrying fluid;
   (e) means to deliver gas under pressure in the space between said tank and said collector and maintain the pressure in said space between that of the heat-carrying fluid at the outlet of said tubes and that of said fluid in the collector, and
   (f) inlet and outlet means for said gas on said tubes interconnecting the space between the tank and the collector and the space above the liquid in the collector.

2. The combination of claim 1, wherein said tubes are provided below said inlet means with a labyrinth type expansion joint allowing said power tube to expand axially without stress.

3. The combination of claim 1, wherein said tank has a closed double-wall top closure forming a heavy water distribution chamber through which said tubes extend; jacket means around said tubes extending below the level of the heavy water in the tank and means connecting the inside of said jacket with said chamber whereby heavy water fed into said chamber may find its way inside the tank.

4. A combination as claimed in claim 1, wherein said collector is supported above the tank bottom by movable rods; tubes through said collector and stay-members extending within said tubes and having one end secured to the tank bottom and the other to the heat insulating shield; said stay members fitting loosely in said tubes so as to leave space for insulation and lateral expansion.

5. A combination as claimed in claim 1, wherein said power tubes are made of sintered aluminum and said calender tubes are made of an aluminum alloy.

References Cited by the Examiner

UNITED STATES PATENTS

| | | | |
|---|---|---|---|
| 2,874,307 | 2/1959 | Wigner et al. | 176—51 |
| 2,977,297 | 3/1961 | Evans et al. | 176—52 |
| 3,001,923 | 9/1961 | Tunnicliffe et al. | 176—52 |
| 3,079,321 | 2/1963 | Oppenheimer et al. | 176—52 |

REUBEN EPSTEIN, *Primary Examiner.*

CARL D. QUARFORTH, *Examiner.*

L. DEWAYNE RUTLEDGE, *Assistant Examiner.*